March 20, 1934.  J. E. HOFFMAN  1,951,912
DISK HARROW
Filed May 2, 1932  2 Sheets-Sheet 2
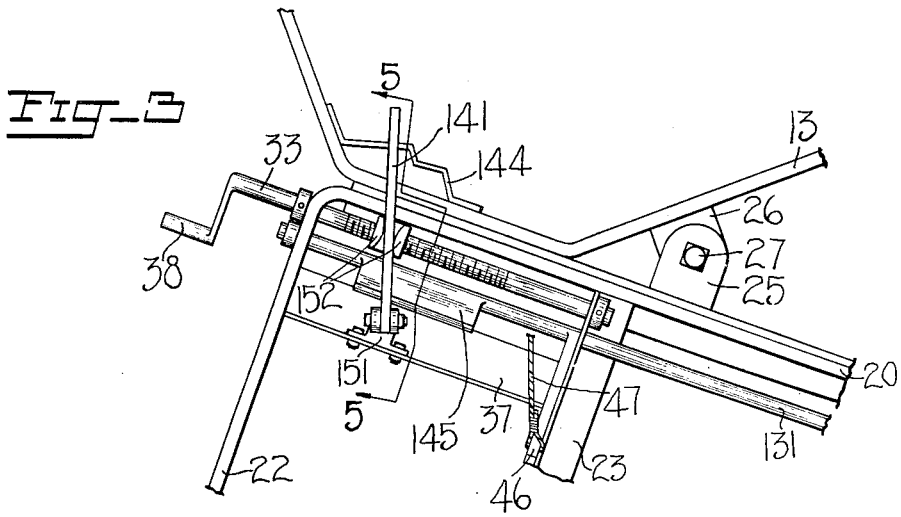
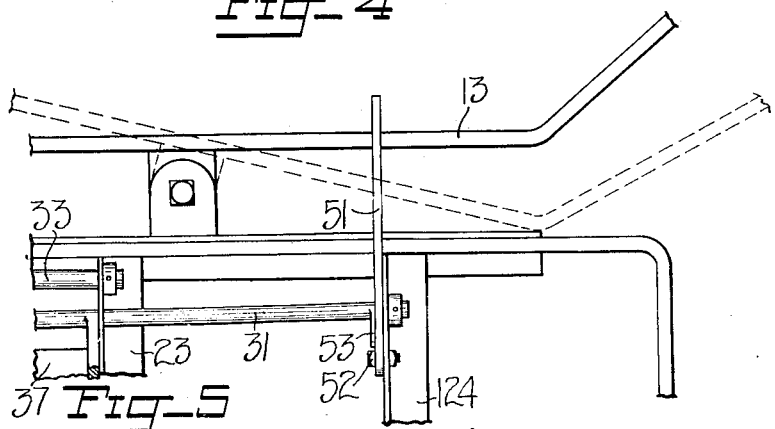
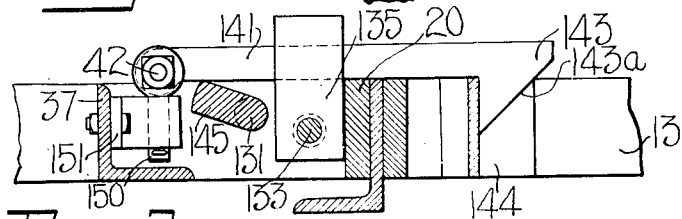
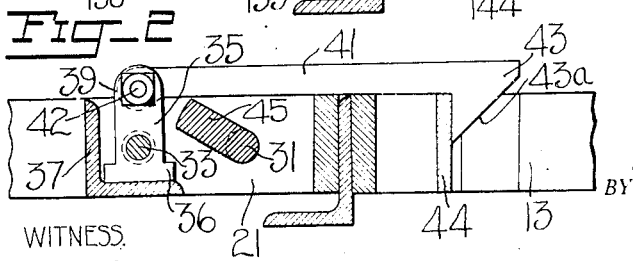
INVENTOR.
John E. Hoffman
BY
E. A. Bopf
ATTORNEY
WITNESS.
Edward Melin Patented Mar. 20, 1934

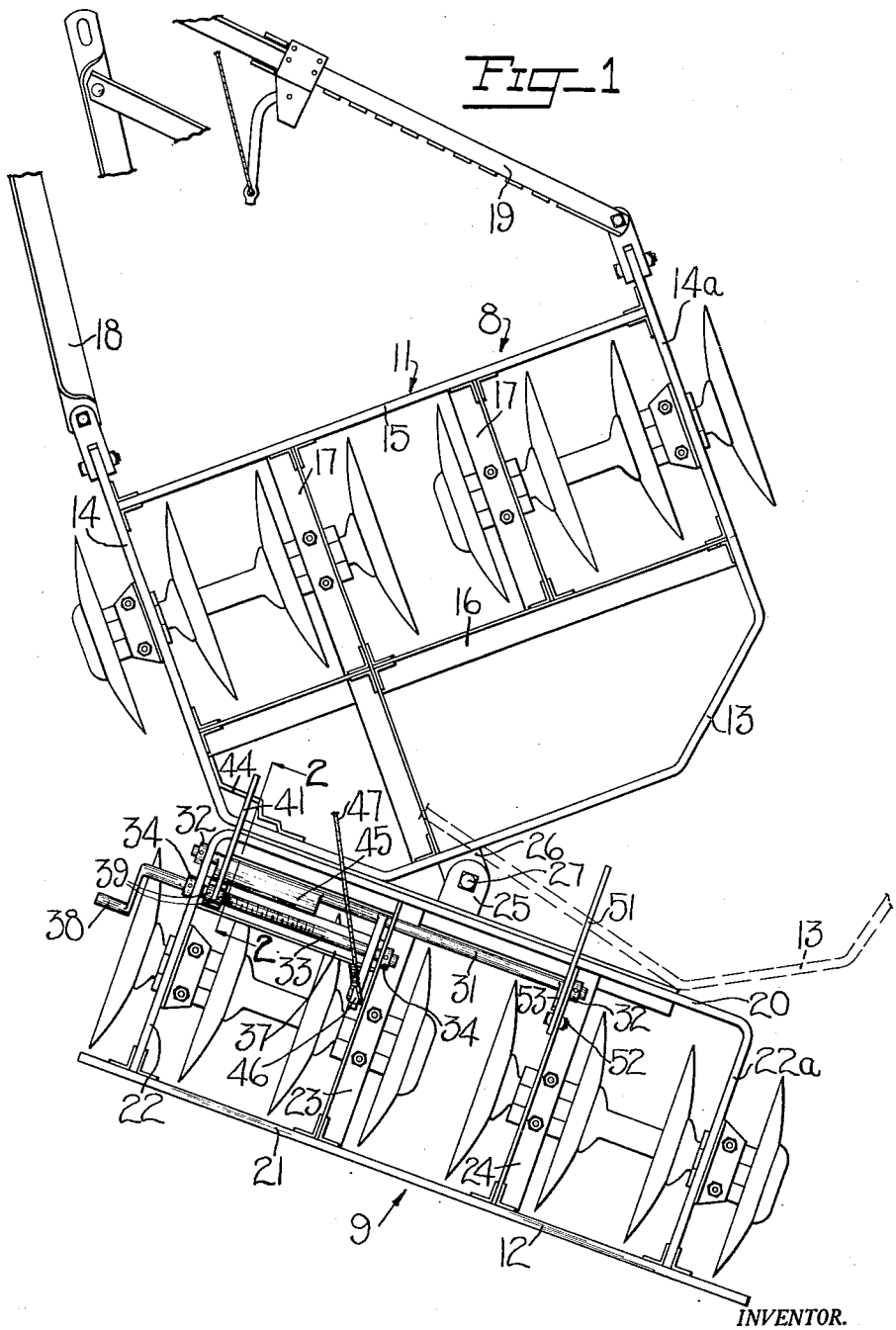

1,951,912

UNITED STATES PATENT OFFICE 1,951,912

DISK HARROW

John E. Hoffman, Moline, Ill., assignor to Deere & Company, Moline, Ill., a corporation of Illinois Application May 2, 1932, Serial No. 608,689

16 Claims. (Cl. 55—83)

My invention relates to disk harrows and particularly to the two gang tandem off-set type. This type of harrow is operated in lateral offset relation to the tractor and it is therefore adapted to orchard cultivation because of its ability to pass beneath the overhanging branches of the trees.

One of the objects of my invention is to provide an improved angle adjusting mechanism which is adapted to hold the gangs in a selected relative angular position or in a parallel transport position, the mechanism being so constructed that the draft stress therein is always in tension in either position.

Another object of my invention is to provide an angle adjusting mechanism which securely holds the front and rear gangs in the desired angular working position, but permits the gangs to automatically enter a greater angle when the harrow is turned in one direction, and to automatically return to the working angle when the harrow is again in the straightaway position.

Another object of my invention is to provide an angle adjusting mechanism which will position itself automatically responsive to the gangs being shifted to a selected working angle to hold the gangs in such working position but will permit the gangs to freely swing into a greater angle to assume a normal trailing position when making a turn in one direction.

Another object of my invention is to provide improved control means by which the working angle in which the gangs are held is determined.

Another object of my invention is to provide improved means for holding the disk gangs in parallel relation when the disk harrow is transported but which permits the gangs to enter into a reverse angle when the harrow is turned in one direction. This holding means is also constructed so that the gangs will automatically return to a parallel position when the turn is completed.

Other objects and advantages of my invention will be apparent to those skilled in the art after a consideration of the following detailed description, taken in conjunction with the accompanying drawings wherein:

Figure 1 is a plan view of a tandem offset type disk harrow adjusted to an angled or operating position and illustrating my improved angle adjusting mechanism;

Figure 2 is an enlarged sectional view of the angle adjusting mechanism taken on the plane of line 2—2 of Figure 1;

Figure 3 is a fragmentary view of the left hand side of the frame and showing a modified form of angle adjusting mechanism;

Figure 4 is a fragmentary view of the right hand side of the frame shown in Fig. 3 and illustrating, in dotted lines, the position of the front gang frame when the disk harrow is turned to the right; and, Figure 5 is a sectional view of the modified form of the angle adjusting mechanism taken on the plane of line 5—5 of Figure 3.

The disk harrow in connection with which I have chosen to illustrate my invention comprises the usual front gang 8 and rear gang 9 having disk supporting frames 11 and 12, respectively. The frame 11 of the front gang 8 comprises a substantially U-shaped frame member 13 having forwardly extending legs 14 and 14a. A pair of disk gang sections are disposed in axial alignment between bars 15 and 16, being supported at their outer ends by legs 14 and 14a and at their inner ends by angle iron bars 17 secured to bars 15 and 16.

The frame 12 of the rear gang 9 comprises a rearwardly disposed U-shaped member 20 and a transverse member 21 secured to the ends of legs 22 and 22a of member 20. Spaced parallel angle iron members 23 and 24 extend between the members 20 and 21 and serve to support the adjacent inner ends of the rear disk gang sections, the outer ends of the gangs being supported on legs 22 and 22a.

The two gangs are pivotally connected together through a bracket 25 secured to the member 20 projecting forwardly therefrom and a similar bracket 26 extending rearwardly from frame member 13. Aligned openings are provided in brackets 25 and 26 to receive a pivot bolt 27.

The two gangs are held in selected angular positions through my improved angle adjusting mechanism described in detail below. This mechanism comprises a rock shaft 31 which is rockably supported in aligned openings in leg 22 and in members 23, 24. The rock shaft 31 is retained against endwise displacement by collars 32 which are secured on the ends of shaft 31. An adjusting rod 33, which is threaded for a portion of its length, is journaled in aligned openings in leg 22 and member 23 rearwardly of rock shaft 31 and parallel thereto. A retaining collar 34 is secured on each end of adjusting rod 33 to prevent endwise displacement of the rod. A follower nut 35 engages the threaded portion of adjusting rod 33 and is adjusted therealong when the rod is rotated. The follower nut 35 is prevented from rotating with rod 33 by means of a flat base portion 36 which is formed on the lower side of the nut and which has a sliding engagement with an angle iron member 37 positioned below the adjusting rod 33 and supported on frame members 22 and 23. The rod 33 is rotated to adjust the follower nut 35 along the threaded portion by a crank handle 38 formed on the outer end of the rod.

A pair of upstanding ears 39 are provided on the upper side of follower nut 35 and a latch member 41 is pivotally connected between these ears by means of a pivot bolt 42 which extends through aligned holes provided in the ears and in the latch member. A hook 43 is formed on the free end of latch member 41, the end thereof having an upwardly inclined surface 43a on its lower side whereby it is adapted to slide over and engage a bracket 44 secured on frame member 13 of the front gang. To place the gangs in a working position, it is merely necessary for the operator to maneuver the tractor, as by turning sharply to the left, after releasing the latch holding the gangs in transport position as will be described later. The gangs will assume an angled position relative to each other, and the latch 41 will ride up over bracket 44 and engage it automatically.

The bracket 44 is provided with a plurality of rearwardly offset step portions which are disposed in such a manner as to be selectively engaged by hook 43 when latch 41 is adjusted laterally. Since each step portion on bracket 44 is disposed in a different transverse vertical plane, the relative angle between the disk gangs may be changed by laterally adjusting latch member 41 to shift hook 43 from contact with one step portion to another. The lateral shifting of latch member 41 is easily and expeditiously accomplished by merely releasing the tension on latch member 41, by backing the tractor a slight distance, and rotating crank 38.

When the disk harrow is in a straightaway operating position and the tractor is advancing the disk harrow, latch member 41 is under a tension strain with hook 43 engaging one of the step portions of bracket 44. The disk harrow is usually turned to the left at the end of the field. When the disk gangs are adjusted in any other than the extreme angled position the front gang is free to swing about pivot 27 until the left side of frame member 13 contacts with the adjacent side of rear frame 20. This greatly facilitates turning since the rear gang is free to assume a trailing position with respect to the front gang, if the angular position thereof is equal to or greater than the working angle at which the gangs are held.

When the disk harrow has completed its turn and is again in a straighaway position the front gang swings back until hook 43 contacts with bracket 44 without further attention by the operator.

When it is desired to straighten the gangs for transport latch 41 is disengaged by means of a trip plate 45 which is formed integral with rock shaft 31 adjacent one end thereof. Rocking rock shaft 31 causes plate 45 to contact with the lower surface of latch 41 and raise it about its pivot 42 until hook 43 is disengaged from bracket 44. The trip plate 45 is of a length equal to the threaded portion of rod 33 and will therefore engage latch 41 in any of its adjusted positions.

Rock shaft 31 is rocked by means of a rope 47 attached to the upper end of an arm 46 fixed to shaft 31. Rope 47 extends forwardly to within reach of the operator on the tractor.

When latch member 41 has been raised so as to disengage bracket 44, the disk gangs 8 and 9 swing around into a position nearly parallel to each other, and by turning slightly to the right, the gangs will swing into parallelism, or slightly beyond, whereupon a latch 51 will engage frame member 13. Latch member 51 is shaped similar to latch member 41 and is pivotally mounted on frame member 24 by a pivot bolt 52. The hook formed on the free end of latch 51 has a similar inclined surface on its under side by reason of which the latch will automatically ride up over and engage frame member 13. The latch 51 holds the gangs in parallel relation, that is, prevents them from swinging into a cutting angle, when the harrow is drawn in a straightaway direction, but will permit the front gang to swing to the right about pivot 27, as shown in dotted lines in Figure 1, that is, into a reverse angle when making a right hand turn. The ability of the harrow to go into a reverse angle facilitates turning to the right appreciably, as is well known in the art.

A trip finger 53 is secured on the opposite end of rock shaft 31 and is adapted to contact with the lower surface of latch 51 and raise it about its pivot 52 for disengaging the latch 51 from the frame member 13 preparatory to shifting the gangs into a working position.

A modified form of adjusting mechanism is shown in Figures 3, 4, and 5. This modified construction comprises a latch 141 similar to latch 41 of the structure just described except that it is mounted for swinging movement in a horizontal plane to position it for engagement with the different step portions on bracket 144 on the first frame. This mounting comprises a pin 150 to which latch 141 is pivoted. Pin 150 is journaled in a bearing 151 fixedly mounted on frame member 37. The swinging of latch 141 is controlled by a crank screw 133 which is similar to crank screw 33, except that it is mounted forwardly of the rock shaft 31 and is provided with a traveling nut 135 having two spaced lugs 152 on its upper side. The latch 141 rests on the nut 135 between lugs 152 whereby turning of the crank screw 133 swings the latch into alignment with any one of the stepped portions on bracket 144. Nut 135 is prevented from turning by reason of its contact with the inner side of frame member 20.

Bracket 144 is similar to bracket 44 except that the stepped portions are slightly angled relative to each other to provide in each case surface perpendicular to latch 141 when positioned in line therewith. Shaft 131 having a plate 145 for raising latch 141 is similar to shaft 31.

While I have described, in connection with the accompanying drawings, the specific form in which I prefer to embody my invention, it is to be understood that the invention is not to be limited to the specific means which I have herein shown and described, and that, in fact, widely different means may be employed in the practice of the broader aspects of my invention.

What I claim, therefore, and desire to secure by Letters Patent is:—

1. The combination with a disk harrow comprising two pivotally connected angularly adjustable disk gangs, of a means for releasably holding the gangs in the desired angular relation, said means comprising a latch member mounted on one of the gangs and adapted to releasably engage with the other gang, and means for shifting the position of said latch member on said one of the gangs to cause said latch member to releasably engage the other gang at different points.

2. The combination with a disk harrow comprising a front and rear gang connected together for relative angular adjustment, of an angle adjusting mechanism for releasably holding the gangs in a selected angular relation comprising a bracket adapted to be secured on the front gang and having rearwardly offset stepped portions formed thereon, and a latch member pivotally mounted on the rear gang and adapted to selectively engage the stepped portions to hold the gangs in the desired relative angle.

3. The combination with a disk harrow comprising a front and rear gang connected together for relative angular adjustment, of an angle adjusting mechanism for releasably holding the gangs in a selected angular relation comprising a bracket adapted to be secured on the front gang and having rearwardly offset stepped portions formed thereon, a latch member pivotally mounted on the rear gang and adapted to be adjusted laterally to engage any selected one of the stepped portions to hold the gangs in the desired relative angle, and a means for tripping said latch member out of engaging position to straighten the gangs for transport.

4. The combination with a disk harrow comprising a front and rear gang connected together for relative angular adjustment, of an angle adjusting mechanism for releasably holding the gangs in a selected angular relation comprising a bracket adapted to be secured on the front gang and having rearwardly offset stepped portions formed thereon, a latch member pivotally mounted on the rear gang and adapted to engage the front gang to hold the gangs in the desired relative angle, a second latch member pivotally mounted on the rear gang and adapted to engage the front gang to hold the gangs in parallel transport relation, and tripping means on the rear gang adapted to trip said latch members out of engaging position.

5. In a tandem offset disk harrow, the combination of a front gang, a rear gang, and a disk supporting frame for each gang, said frames being pivotally connected together to permit relative angular adjustment thereof, with an angle adjusting mechanism comprising a bracket secured on the front frame, a plurality of rearwardly offset stepped portions formed on said bracket, a latch member pivotally mounted on the rear frame and adapted to be shifted laterally to selectively engage said stepped portions to secure the frames in a selected angular relation, means for shifting said latch member laterally, a second latch member pivotally mounted on the rear frame and engageable with the front frame to secure the frames in parallel transport relation, and trip means mounted on the rear frame and adapted to disengage said latch members from their engagement with the front frame.

6. In a tandem offset disk harrow, the combination of a front gang, a rear gang, and a disk supporting frame for each gang, said frames being pivotally connected together to permit relative angular adjustment thereof, with an angle adjusting mechanism comprising a bracket secured on the front frame, a plurality of rearwardly offset stepped portions formed on said bracket, a latch member pivotally mounted on the rear frame and adapted to be shifted laterally to selectively engage said stepped portions to secure the frames in a selected angular relation, means for shifting said latch member laterally, a second latch member pivotally mounted on the rear frame and engageable with the front frame to secure the frames in parallel transport relation, and trip means mounted on the rear frame and adapted to disengage said latch members from their engagement with the front frame.

7. In a tandem offset disk harrow, the combination of a front gang, a rear gang, and a disk supporting frame for each gang, said frames being pivotally connected together to permit relative angular adjustment thereof, with an angle adjusting mechanism comprising a bracket secured on the front frame, a plurality of rearwardly offset stepped portions formed on said bracket, a bracket secured on the rear frame, a pivot block supported in said bracket, a latch member pivotally mounted on said pivot block, a threaded adjusting rod supported in the rear frame, means by which the adjusting rod may be rotated, a follower nut threaded on said adjusting rod, a pair of upstanding ears on the follower nut adapted to embrace said latch member whereby said member may be swung laterally to selectively engage said stepped portions to secure the frames in a selected angular relation, a second latch member pivotally mounted on the rear frame and engageable with the front frame to secure the frames in parallel transport relation, a rock shaft journaled in the rear frame, trip members secured on the rock shaft and positioned so as to contact the latch members to raise them out of engagement with the front frame, and an arm secured on the rock shaft and adapted to rotate the trip members to raise said latch members when it is desired to angle or straighten the disk gangs.

8. In a tandem offset disk harrow, the combination of a front gang, a rear gang, and a disk supporting frame for each gang, said frames being pivotally connected together to permit relative angular adjustment thereof, with an angle adjusting mechanism comprising a bracket secured on the front frame, a plurality of rearwardly offset stepped portions formed on said bracket, a threaded adjusting rod journaled in the rear frame, a follower nut non-rotatably engaging said rod, and a latch member pivotally mounted on said follower nut and laterally adjustable therewith to selectively engage said stepped portions to secure said frames in a selected angular relation.

9. In a tandem offset disk harrow, the combination of a front gang, a rear gang, and a disk supporting frame for each gang, said frames being pivotally connected together to permit relative angular adjustment thereof, with an angle adjusting mechanism comprising a bracket secured on the front frame, a plurality of rearwardly offset stepped portions formed on said bracket, a threaded adjusting rod journaled in the rear frame, a follower nut non-rotatably engaging said rod, a latch member pivotally mounted on said follower nut and laterally adjustable therewith to selectively engage said stepped portions to secure said frames in a selected angular relation, a second latch member pivotally mounted on the rear frame and engageable with the front frame to secure the frames in parallel transport relation, a rock shaft journaled in the rear frame, a trip plate secured adjacent one end of said rock shaft and adapted to contact with the lower edge of the latch member in any of its lateral adjustments, a trip finger secured adjacent the opposite end of said rock shaft and adapted to contact with the lower edge of said second latch member, and an arm secured on the rock shaft between the ends thereof and adapted to be actuated to rock said rock shaft when it is desired to angle or straighten the disk gangs.

10. The combination with a disk harrow comprising two pivotally connected tandem disk gangs, of a pair of latches one of which is mounted on one gang and is adapted to engage the other gang when the two gangs are shifted into a certain operating position and prevent the gangs shifting to transport position meanwhile permitting said gangs to shift beyond said certain operating position under the action of the draft when turning in one direction, and the other of which is mounted on one gang and is adapted to engage the other gang when the two gangs are shifted into a transport position and prevent the gangs being shifted into an operating position meanwhile permitting said gangs to shift in the opposite direction under the action of the draft when turning in the opposite direction.

11. The combination with a disk harrow comprising two pivotally connected tandem disk gangs, of a pair of latches mounted on one gang, said latches being adapted to automatically engage the other gang when the two gangs are shifted into an operating position and into a transport position, respectively, means for shifting one of said latches to cause it to engage said other gang at different points, a rock shaft mounted on one gang, and means on said rock shaft for moving both of said latches into a disengaging position when said rock shaft is rocked irrespective of the position into which said one latch has been shifted.

12. The combination with a disk harrow comprising two tandem pivotally connected disk gangs, of angle adjusting mechanism comprising means automatically operative by the shifting of said gangs to one of several working positions for holding said gangs from swinging into a lesser angular position meanwhile permitting said gangs to freely swing into a greater angular position, and control means for selecting which of the several working positions said gangs will be so held.

13. The combination with a disk harrow comprising two pivotally connected tandem disk gangs, of a pair of latches one of which is automatically operative by the shifting of said gangs to a certain working position for holding said gangs from swinging into a lesser angular position meanwhile permitting said gangs to freely swing into a greater angular position, the other of said latches being automatically operative by the shifting of said gangs to a transport position for holding said gangs from swinging into a working position meanwhile permitting said gangs to freely swing into a reverse angular position.

14. The combination with a disk harrow comprising two pivotally connected tandem disk gangs, of a pair of latches one of which is automatically operative by the shifting of said gangs to a certain working position for holding said gangs from swinging into a lesser angular position meanwhile permitting said gangs to freely swing into a greater angular position, the other of said latches being automatically operative by the shifting of said gangs to a transport position for holding said gangs from swinging into a working position meanwhile permitting said gangs to freely swing into a reverse angular position, and control means for shifting the first latch for predetermining said certain working position in which said gangs will be held.

15. The combination with a disk harrow comprising two pivotally connected angularly adjustable disk gangs, of means for releasably holding the gangs in a desired angular relation, said means comprising a latch member mounted on one of the gangs and a cooperating member mounted on the other gang releasably engaged by said latch member and having a series of stepped portions, one of said members being shiftable relative to the gang upon which it is mounted to cause the latch member to engage the cooperating member at a selected one of the steps, to vary the angular relation in which the gangs are held.

16. The combination with a disk harrow comprising two pivotally connected angularly adjustable disk gangs, of means for releasably holding the gangs in a desired angular relation, said means comprising a latch member mounted on one of the gangs and a cooperating member mounted on the other gang releasably engaged by said latch member at different positions, one of said members being shiftable relative to the gang upon which it is mounted to cause the latch member to engage the cooperating member at a selected position, to vary the angular relation in which the gangs are held.

JOHN E. HOFFMAN.